United States Patent [19]

Ion et al.

[11] 4,218,935
[45] Aug. 26, 1980

[54] RECONNECT INTERLOCK

[75] Inventors: John C. Ion, Doylestown; George M. Zieber, Jr., King of Prussia; Stanley L. Loewenstern, Philadelphia, all of Pa.

[73] Assignee: Teleflex Incorporated, Limerick, Pa.

[21] Appl. No.: 880,291

[22] Filed: Feb. 22, 1978

[51] Int. Cl.² ............................................. F16C 1/10
[52] U.S. Cl. .................................. 74/501 R; 403/353
[58] Field of Search ................... 74/501 R; 24/223; 403/353, 331, 315, 316

[56] References Cited

U.S. PATENT DOCUMENTS

| | | | |
|---|---|---|---|
| 2,296,993 | 9/1942 | Gerry | 74/501 |
| 4,050,327 | 9/1977 | Thomas et al. | 403/353 |

FOREIGN PATENT DOCUMENTS 719512  4/1942  Fed. Rep. of Germany ........... 403/353

*Primary Examiner*—Kenneth Dorner
*Attorney, Agent, or Firm*—McGlynn and Milton

[57] ABSTRACT

A motion transmitting remote control assembly which prevents connection of the outer casing members of adjoining mechanical push-pull control sections unless the inner translating core members are connected. The assembly includes at least two inner translating core members for transmission of motion and being detachably connected for allowing connected and disconnected positions. At least two outer casing members slidably receive the inner translating core members and are detachably attached by a coupling nut for allowing attached and unattached positions. A spring-loaded finger member having a flange portion is pivotally housed in a longitudinal cavity in one of the core members. A head member is connected to the other core member by an extension member. The first-mentioned core member has a slot which terminates in a radial bore adjacent the longitudinal cavity for receiving the extension member and the head member. The finger member has a reactive surface which cooperates with an interaction surface on the head member for moving the finger member to a retracted position when the inner translating core members are connected in order to provide an operable position of the assembly whereby the outer casing members may be connected. Additionally, the second-mentioned inner translating core member engages a shoulder surface defined by its associated outer casing member to limit axial movement of the second core member.

21 Claims, 5 Drawing Figures

RECONNECT INTERLOCK

BACKGROUND OF THE INVENTION

1. Field of the Invention

The subject invention relates to push-pull cable controls in which inner translating core members surrounded by outer casing members transmit mechanical motion in either direction to, or from, an operative component. In many applications of these control cables, the push-pull control system is comprised of a number or series of separable adjoining control or cable sections. This type of construction is required in aircraft, for example, because numerous maintenance and inspection activities occur which require many connect and disconnect operations. A number of cases have been reported where after inspection or maintenance, the outer casing members of adjoining mechanical push-pull control sections have inadvertently been connected without having the inner translating core members being connected. It is apparent that if the translating core members of adjoining controls have not been joined or properly connected, the control will not properly transmit mechanical motion. If such an event occurs in the case of an aircraft throttle control, the aircraft may be stuck on full throttle and the pilot will be unable to decrease power because the translating core members have not been connected.

2. Description of the Prior Art

Typically, the prior art push-pull cable controls include detachable connections; however, the prior art control cables allow connection of the outer casing members without connecting the inner translating core members.

SUMMARY OF THE INVENTION

The subject invention relates to a motion transmitting remote control assembly of the type for transmitting longitudinal movement along a curved path and comprising a flexible motion transmitting means for transmission of motion and having detachable connection means for allowing connected and disconnected positions. Outer casing means slidably receive the motion transmitting means and have detachable attachment means for allowing attached and unattached positions. A control means has an operable position for permitting the outer casing means to be in the attached position only when the motion transmitting means is in the connected position and an inoperable position for preventing the outer casing means to be in the attached position when the motion transmitting means is in the unconnected position.

PRIOR ART STATEMENT

A fast-make detachable connection for a push-pull control cable assembly is shown in U.S. Pat. No. 4,050,327 granted Sept. 27, 1977 to R. J. Thomas et al. This patent discloses a control cable assembly which employs a ball and socket connection for the inner translating core members and a coupling nut for attaching the outer casing members. This assembly, however, does not disclose a control means which prevents the inadvertent attachment of the outer casing members unless the inner translating core members are properly connected. U.S. Pat. No. 1,943,980 to A. W. Mall discloses a connector for a coaxial rotary flexible transmitter. The outer casing members of this assembly cannot be joined until a drive shank of one core member and a drive nut of another core member are properly engaged but the assembly disclosed in this patent does not include an independent control means for preventing connection of two casing members unless the core elements are connected. The use of a spring-loaded finger member is shown in U.S. Pat. No. 848,334 to P. E. Williams. The assembly shown in this patent discloses a pin which will cause a spring-loaded finger to retract below the inside diameter of a sleeve in order to allow a spring-loaded hammer to impart a blow to a dental tool but this patent does not suggest control means for preventing connection of casing members in a motion transmitting remote control assembly unless the core elements are attached.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
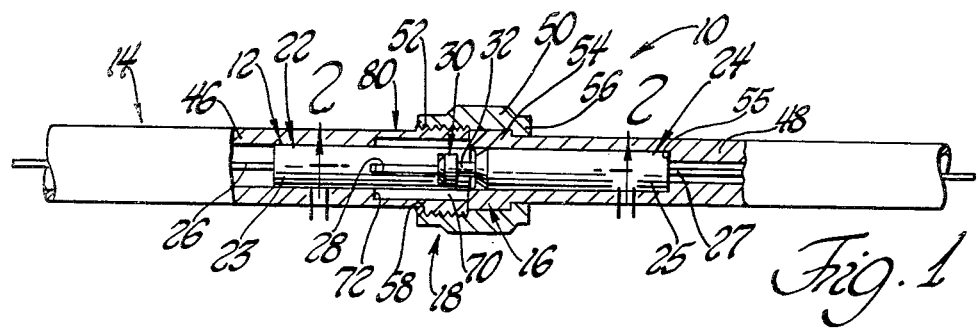
FIG. 1 is a fragmentary plan view partially broken away and in cross section of a reconnect interlock assembly constructed in accordance with the instant invention.
Figure 2:
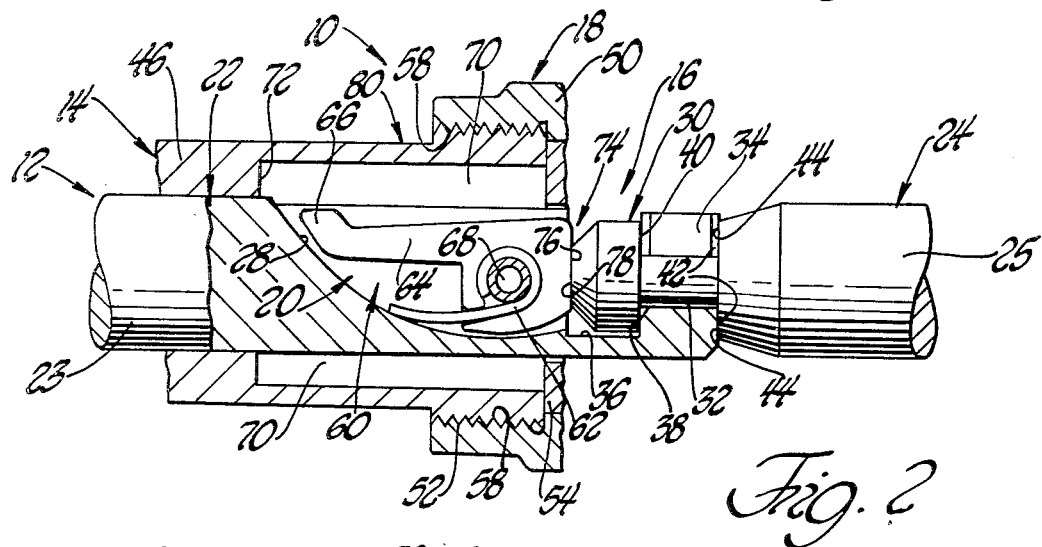
FIG. 2 is a fragmentary cross-sectional view taken substantially along line 2—2 of FIG. 1.
Figure 3:
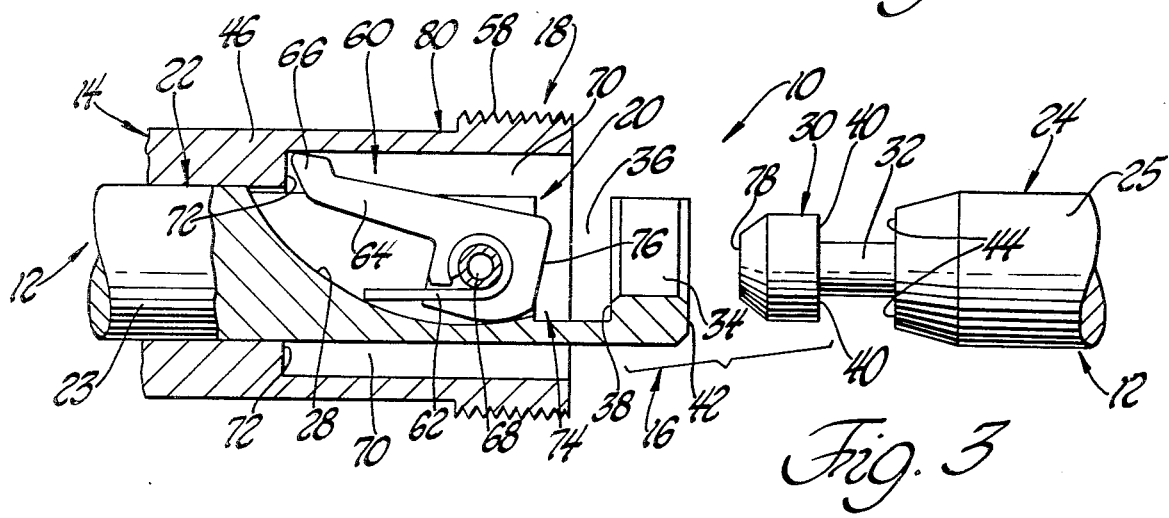
FIG. 3 is a fragmentary cross-sectional view similar to FIG. 2 but showing the components in an alternative position.
Figure 4:
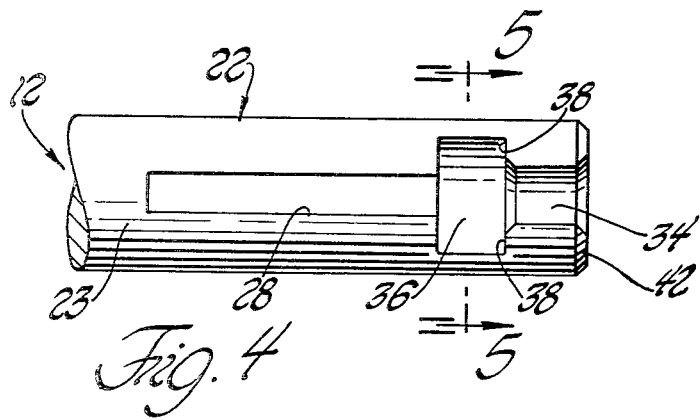
FIG. 4 is an enlarged plan view illustrating details of the inner translating core member having the longitudinal cavity.
Figure 5:
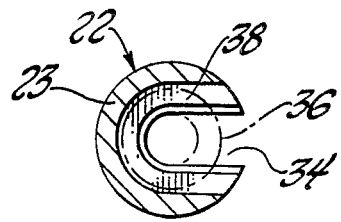
FIG. 5 is a cross-sectional view taken substantially along line 5—5 of FIG. 4.

Referring to FIGS. 1, 2 and 3, a motion transmitting remote control assembly of the type for transmitting longitudinal movement along a curved path and constructed in accordance with the subject invention is generally shown at 10. A flexible motion transmitting means for transmission of motion is generally shown at 12 and the outer casing means for slidably receiving the motion transmitting means 12 is generally shown at 14.

The flexible motion transmitting means 12 has detachable connection means generally shown at 16 and the outer casing means 14 has detachable attachment means generally shown at 18. The detachable connection means 16 allows connected and disconnected positions of the flexible motion transmitting means 12 while the detachable attachment means 18 allows attached and unattached positions of the outer casing means 14. FIGS. 1 and 2 illustrate the connected position of the flexible motion transmitting means 12 and the attached position of the outer casing means 14. FIG. 3 illustrates the disconnected position of the flexible motion transmitting means 12 and the unattached position of the outer casing means 14.

Referring to FIGS. 2 and 3, the assembly 10 includes separate or independent control means generally shown at 20. As shown in FIG. 2, the control means 20 has an operable position for permitting the outer casing means 14 to be in the attached position only when the flexible motion transmitting means 12 is in the connected position. As shown in FIG. 3, the control means 20 also has an inoperable position for preventing the outer casing means 14 from being in the attached position when the flexible motion transmitting means is in the unconnected position. The control means 20 includes interference means, coaction means and biasing means which will be described in greater detail hereinafter.

The flexible motion transmitting means 12 includes at least two inner translating core members generally indicated at 22 and 24 for providing the connected and disconnected positions of the flexible motion transmitting means 12. The inner translating core members 22 and 24 may be one of various constructions of push-pull cable control assemblies. Referring to FIG. 1, the inner translating core members 22 and 24 include the embodiment wherein the inner translating core member 22 includes a female connect member 23 which is fixedly secured to an inner core 26 of a control cable and the inner translating core member 24 includes a male connect member 25 which is fixedly secured to an inner core 27 of a control cable. The cores 26 and 27 may be flexible strips or flexible cables. The cores 26 and 27 are flexible to facilitate movement along a curved path. For example, the control assembly may extend through a tortuous path from the throttle control in the cockpit of an airplane to the throttle assembly on the engine. It is also possible to consider the core members 22 and 24 as being an integral part of the inner translating core member of a typical control cable.

Referring to the drawings in general, at least one of the inner translating core members 22 has a longitudinal cavity 28 for housing the control means 20. The detachable connection means 16 includes a head member generally indicated at 30 and an extension member 32 connecting the head member 30 to a second inner translating core member 24. The detachable connection means 16 further includes a slot 34 extending radially inwardly from the outer edge of said first-mentioned inner translating core member 22 and terminating in a radial bore 36 adjacent the longitudinal cavity 28 for receiving the head member 30 and the extension member 32. In addition, a collar surface 38 is defined by the radial bore 36 in the first-mentioned core member 22. A seating surface 40 defined by an area on the head member 30 of the second-mentioned core member 24 is adapted to seat on the collar surface 38 of the first-mentioned core member 22. The connected position as shown in FIGS. 1 and 2, includes the head member 30 positioned in the radial bore 36 adjacent the longitudinal cavity 28 and the seating surface 40 is engageable with the collar surface 38.

The detachable connection means 16 further includes an outer surface portion 42 at the outer edge of the first-mentioned core member 22 and an outer surface portion 44 of the second-mentioned core member 24. The outer surface portions 42 and 44 have complementary shapes which are adapted to be engageable with each other. These outer surface portions 42 and 44 aid in transmission of compressive mechanical axial motion while the collar surface 38 and seating surface 40 of the head member 30 provides for transmission of tensile forces.

Referring to FIGS. 1, 2 and 3, the outer casing means 14 includes at least two outer casing or conduit members 46 and 48 in order to provide attached and unattached positions of the outer casing means 14.

Referring to FIG. 1, the outer casing or conduit members 46 and 48 may be end fittings or connector housings which are typically made of metal or the like, and are adapted to be secured to the outer casing or sheath of a flexible control cable. It is also possible to consider the outer casing or conduit members 46 and 48 as an integral part of a control cable assembly.

The detachable attachment means 18 of the outer casing means 14 includes a coupling nut 50 having threads 52. As seen in FIG. 1, the outer casing member 48 has an upwardly extending stop flange 54 while the end of the coupling nut 50, opposite the threads 52, terminates in a downwardly extending stopping flange 56 in order that the coupling nut 50 is carried on the outer casing member 48. Threads 58 on the other outer casing member 46 correspond to and are adapted to threadedly engage the threads 52 of the coupling nut 50 to provide the attached position. Additionally, as shown in FIGS. 1 and 2, it is noted that the left-hand face of the upwardly extending stop flange 54 of the outer casing member 48 may butt against the right-hand face of outer casing member 46. In other words, the flange 54 of outer casing member 48 extends axially from the shoulder which engages coupling nut 50 to allow contact with outer casing member 48 when the outer casing members 46 and 48 are in the attached position. This prevents outer casing member 48 from moving axially back and forth under tension and compression modes of operation which would happen if there were a space between outer casing members 46 and 48.

Referring to FIGS. 2 and 3, the control means 20 includes interference means generally indicated at 60. The interference means 60 is movable between a stored position as shown in FIG. 2 and an interference position as shown in FIG. 3 in response to the connected and disconnected positions of the flexible motion transmitting means 12 for providing the operable and inoperable positions of the control means 20. The control means 20 further includes biasing means for urging the interference means 60 to the interference position. The biasing means can take the form of a spring 62, as illustrated, but could also include a magnet, or an equivalent means.

In the preferred embodiment illustrated in FIGS. 2 and 3, the interference means 60 includes a finger member 64 having a flange portion 66. The finger member 64 and the flange portion 66 are positioned in the longitudinal cavity 28 of the first-mentioned core member 22 and are pivotally attached therein, indicated at 68, to allow movement between a protruded position shown in FIG. 3 and a retracted position shown in FIG. 2 relative to the core members 22 and 24 for providing the above-mentioned interference and stored positions.

There are abutment means for cooperating with the interference means 60 when the interference means 60 is in the interference position. The abutment means takes the form of an annular groove or recess 70 which is axially disposed within at least one of the outer casing members 46. The annular groove or recess 70 defines an abutment surface 72 in the outer casing member 46 for engaging with the flange portion 66 of the finger member 64 to provide the interference position. The biasing means or spring 62 urges the finger member 64 to its protruded position (FIG. 3) and the flange portion 66 is engageable with the abutment means or abutment surface 72 when the finger member 64 and its flange portion 66 are in said protruded position.

The threads 58 of the outer casing member 46 are unengageable with the threads 52 of the coupling nut 50 when the flange portion 66 is in said protruded position and engaging the abutment surface 72 which provides the inoperable position of the control means 20. More specifically, when the flange portion 66 of finger member 64 is engaging the abutment surface 72, the core member 22 cannot move axially into outer casing member 46 and, as a result, the coupling nut 50 carried by outer casing member 48 will be prevented from getting close enough to outer casing member 46 in order to allow the threads 52 of the coupling nut 50 to threadedly engage the threads 58 of outer casing member 46.

In order to positively position inner core member 24 (male connect member 25) to cause an interference with inner core member 22 (female connect member 23) to prevent the above-described thread engagement, core member 24 must be restricted to prevent core member 24 from moving axially into the bore of outer casing member 48. Thus, referring to FIG. 1, motion limiting means 55 are provided for limiting axial movement of the second inner translating core member 24 so that core member 24 may cooperate with control means 20 to provide the inoperable position; i.e., preventing thread engagement of coupling nut 50 to outer casing member 46. The motion limiting means 55 comprises a shoulder surface defined by the second outer casing member 48 for engagement with the end of the male connect member 25 of the second inner translating core member 24 to provide the limited axial movement thereof.

As mentioned earlier, the control means 20 includes coaction means generally shown at 74 which move the interference means 60 to the stored position (FIG. 2) when the motion transmitting means 12 is in its connected position. In the preferred embodiment, the coaction means 74 includes a reactive surface 76 defined by a portion of the finger member 64 which will coact with the head 30 of the other core member 24 to move the finger member 64 to its retracted position in order to provide the stored position of the interference means 60, as shown in FIG. 2. A portion of the head member 30 defines an interaction surface 78. This interaction surface 78 cooperates with the reactive surface 76 on the finger member 64 when the motion transmitting means 12 is in its connected position in order to move the finger member 64 to its retracted position.

In operation, when the inner translating core members 22 and 24 are in the disconnected position as shown in FIG. 3, the spring 62 urges the finger member 64 to be in its protruded position. The flange portion 66 will then engage the abutment surface 72 of the outer casing member 46 to prevent relative movement of inner translating core member 22 into outer casing member 46. Since the core members 22 and 24 cannot slide far enough into outer casing members 46 and 48 to allow the coupling nut 50 carried by outer casing member 48 to get close enough to the threads 58 on outer casing member 46, the threads 52 of coupling nut 50 are unengageable with the threads 58 of outer casing member 46.

When the inner translating core members 22 and 24 are properly connected as shown in FIGS. 1 and 2, the interaction surface 78 on the head member 30 cooperates with the reactive surface 76 on the finger member 64 which provides a wedging action to retract the finger member 64 against the forces of the biasing means or spring 62 which is urging the finger member 64 to its protruded position. The finger member 64 will then be in its retracted position so that flange portion 66 will not engage abutment surface 72. This allows the inner translating core member 22 to be axially disposed into outer casing member 46 so that core member 22 will not interfere with the coupling nut 50 carried by outer casing member 48 getting close enough to the threads 58 on outer casing member 46 to allow the threads 52 on coupling nut 50 to be threadedly engageable therewith.

In order to limit access to the control means 20, the assembly 10 includes enclosure means. In the preferred embodiment the enclosure means consists of the portion of the outer casing member 46, which is the one that has the annular groove or recess 70, surrounding the annular groove or recess 70 and is generally indicated at 80. The portion 80 of the outer casing member 46 which provides the enclosure means is formed by having the abutment surface 72 being axially disposed within the outer casing member 46 a distance of at least the axial length of the finger member 64. Thus, it would be difficult to move the finger member 64 to its retracted position by a foreign object such as a screw driver or someone's finger as a result of the enclosure means.

It is only when the motion transmitting means 12 is completely and properly connected that the outer casing means 14 can be attached by the coupling nut 50. Thus, the inadvertent connection of the outer casing means 14 without connecting the inner transmitting means 12 is prevented.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A motion transmitting remote control assembly of the type for transmitting longitudinal movement along a curved path and comprising; a flexible motion transmitting means for transmission of motion and having detachable connection means for allowing connected and disconnected positions, outer casing means for slidably receiving said motion transmitting means and having detachable attachment means for allowing attached and unattached positions, and control means having an operable position for permitting said outer casing means to be moved to said attached position only when said motion transmitting means is in said connected position and an inoperable position for preventing said outer casing means from being moved to said attached position when said motion transmitting means is in said unconnected position.

2. An assembly as set forth in claim 1 including enclosure means for limiting access to said control means.

3. An assembly as set forth in claim 1 wherein said control means includes interference means movable between a stored position and an interference position in response to said connected and disconnected positions of said motion transmitting means for providing said operable and inoperable positions of said control means.

4. An assembly as set forth in claim 3 wherein said control means includes coaction means for moving said interference means to said stored position when said motion transmitting means is in said connected position.

5. An assembly as set forth in claim 4 wherein said control means further includes biasing means for urging said interference means to said interference position.

6. An assembly as set forth in claim 5 including abutment means for cooperating with said interference means when said interference means is in said interference position to provide said inoperable position of said control means.

7. An assembly as set forth in claim 6 wherein said motion transmitting means includes at least two inner translating core members for providing said connected and disconnected positions of said motion transmitting means.

8. An assembly as set forth in claim 7 including a longitudinal cavity in at least one of said inner translating core members for housing said control means.

9. An assembly as set forth in claim 8 including motion limiting means for limiting axial movement of a second inner translating core member so that said second core member may cooperate with said control means to provide said inoperable position.

10. An assembly as set forth in claim 9 wherein said interference means includes a finger member having a flange portion, said finger member and said flange portion being positioned in said longitudinal cavity of said first-mentioned core member and pivotally attached therein to allow movement between protruded and retracted positions relative to said core member for providing said interference and stored positions, said biasing means urging said finger member to said protruded position and said flange portion engageable with said abutment means when said finger member and said flange portion are in said protruded position.

11. An assembly as set forth in claim 10 wherein said detachable connection means includes a head member and an extension member connecting said head member to said second inner translating core member.

12. An assembly as set forth in claim 11 wherein said detachable connection means further includes a slot extending radially inwardly from the outer edge of said first-mentioned inner translating core member and terminating in a radial bore adjacent said longitudinal cavity for receiving said head member and said extension member, a collar surface defined by said radial bore in said first-mentioned core member, and a seating surface defined by said head member of said second-mentioned core member adapted to seat on said collar surface of said first-mentioned core member, said connected position includes said head member positioned in said radial bore adjacent said longitudinal cavity and said seating surface being engageable with said collar surface.

13. An assembly as set forth in claim 12 wherein said detachable connection means further includes an outer surface portion of said first-mentioned core member and an outer surface portion of said second-mentioned core member, said outer surface portions having complementary shapes adapted to be engageable with each other.

14. An assembly as set forth in claim 12 wherein said coaction means includes a reactive surface defined by a portion of said finger member for coacting with said head member to move said finger member to said retracted position to provide said stored position of said interference means.

15. An assembly as set forth in claim 14 including an interaction surface defined by a portion of said head member, said interaction surface cooperating with said reactive surface when said motion transmitting means is in said connected position for moving said finger member to said retracted position.

16. An assembly as set forth in claim 15 wherein said outer casing means includes at least two outer casing members for providing said attached and unattached positions of said outer casing means.

17. An assembly as set forth in claim 16 wherein said abutment means includes an annular groove axially disposed within at least one of said outer casing members, said annular groove defining an abutment surface in said outer casing member for engaging with said flange portion to provide said interference position.

18. An assembly as set forth in claim 17 wherein said detachable attachment means of said outer casing means includes a coupling nut having threads being carried on at least one of said outer casing members, corresponding threads on the other of said outer casing members adapted to threadedly engage said coupling nut to provide said attached position, said threads being unengageable when said flange portion is in said protruded position and engaging said abutment surface to provide said inoperable position of said control means.

19. An assembly as set forth in claim 18 wherein said motion limiting means includes a shoulder surface defined by a second outer casing member for engagement with said second inner translating core member to provide said limited axial movement thereof.

20. An assembly as set forth in claim 19 including enclosure means for limiting access to said control means.

21. An assembly as set forth in claim 20 wherein said enclosure means includes the portion of said outer casing member surrounding said annular groove, said abutment surface being axially disposed within said outer casing member a distance of at least the axial length of said finger member.

* * * * *